April 3, 1951      M. A. HOLBROOK      2,547,210

COASTING SLED

Filed July 28, 1945

*INVENTOR.*
MAX A. HOLBROOK
BY
*Gray and Smith*

ATTORNEYS

Patented Apr. 3, 1951

2,547,210

UNITED STATES PATENT OFFICE 2,547,210

COASTING SLED

Max A. Holbrook, Coldwater, Mich., assignor to Pratt Manufacturing Company, Coldwater, Mich., a limited copartnership Application July 28, 1945, Serial No. 607,591

8 Claims. (Cl. 280—21)

The present invention relates to a coasting sled, and more particularly to a coasting sled having an improved and simplified mechanism for steering coasting sleds.

An object of the present invention is to provide a coasting sled having a simplified and relatively inexpensive sled steering mechanism in which the flexible steering runners are simultaneously flexed and rotated to provide a banked steering action on the sled structure.

A further object of the present invention is to provide a coasting sled having continuous flexible runners pivotally connected to depending knees to permit pivotal movement of the sled runners about a line parallel to the longitudinal axis thereof.

Another object of the present invention is to provide a coasting sled having a steering mechanism having a high mechanical efficiency due to the ratio of the lever arms used and which is adapted to effect a simultaneous rotative movement of the runners about their longitudinal axes while bowing the forward ends thereof, the steering mechanism being so designed as to reduce to a minimum the amount of force required to be applied to the steering bar in order to steer the sled.

A further object of the present invention is to provide a coasting sled in which the steering effort is applied by simultaneously bowing the forward portion of the runners and rotating the said runners about their longitudinal axes while maintaining the deck portion in a plane substantially parallel to the longitudinal axes of said runners.

A further object of the present invention is to provide a coasting sled which can be easily turned on a relatively short radius with a minimum of tangential skidding by bowing the forward end of the runners while rotating them about their longitudinal axes.

Other objects of this invention will appear in the following description and appended claims, reference being had to the accompanying drawings forming a part of this specification wherein like reference characters designate corresponding parts in the several views.

In the drawings:

Fig. 1 is a side elevation of a sled embodying the essential features of the present invention.

Fig. 2 is a top plan view with a portion of the deck structure broken away and showing a sled embodying the essential features of the present invention. The solid line portion showing the relative positions of the parts of the steering mechanism when the sled is moving in a straight line direction and the dotted line portions showing the relative position of the parts of the steering mechanism when moved to turn the sled to the right.

Figure 1:
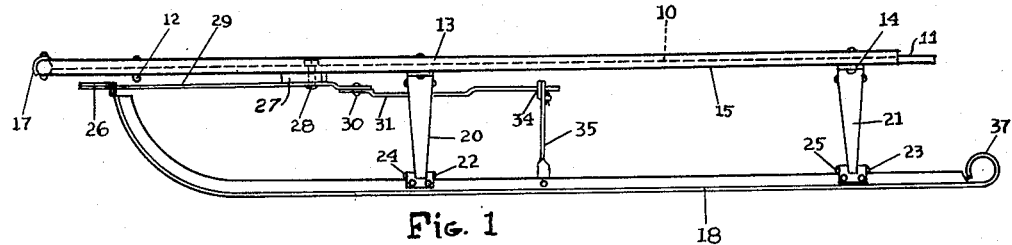

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A sled construction embodying the present invention comprises a rigid top deck 10 preferably formed of a plurality of rigid spaced slat members 11 which are secured to a front cross member 12, a central cross-bolster 13 and a rear cross-bolster 14. The front cross member 12 and the central cross-bolster 13 and the rear cross-bolster 14 have extending end portions to which are secured the side arms 15 of a substantially U-shaped tubular frame, whose front portion 16 is connected with a rearwardly extending bracket 17 secured to the front end of the central slat 11 of the deck 10.

A pair of substantially parallel runners 18 and 19 generally T-shaped in cross-section and having turned rear end portions 37 and 38 respectively, are mounted beneath the top and are attached at each side to the knees 20 and 21 secured respectively to the ends of the central cross-bolster 13 and to the ends of the rear cross-bolster 14. The runners 18 and 19 and the ends of the knees 20 and 21 are pivotally connected by the brackets 22 and 23, which are secured to the vertical web of the said runners and the hinge pins 24 and 25 extending respectively through the top portions of said brackets 22 and 23, and the ends of the knees 20 and 21, respectively. This provides a pivotal connection in which the runners 18 and 19 may pivot about the pins 24 and 25 to thereby bank the runners when making a turn with the sled.

The runners 18 and 19 are each flexible and are pivotally connected at their forward ends to the cross-head 26 by means of which the forward portion of the runners 18 and 19 lying ahead of the knees 20 may be bowed to permit steering of the sled. The runners 18 and 19 are simultaneously bowed for steering and pivoted for banking by movement of a steering bar 27 which extends across the deck 10, and is pivotally connected therewith at the pivot point 28. A lever arm 29 is rigidly secured to the steering bar 27 and has a forwardly extending portion pivotally connected at its end to the cross-head 26 and a rearwardly extending portion pivotally connected at its end by the pivotal connection 30 with a rearwardly extending lever 31 attached to the central cross-bolster 13 at the pivotal connection 32. The rear end of the lever 31 is pivotally connected with cross links 33 and 34 which extend outwardly therefrom toward the runners 18 and 19. The opposite ends of the cross-links 33 and 34 are connected with rigid vertically extending brackets 35 and 36 secured to the webs of the runners 18 and 19, respectively.

In connection with the bowing of the runners 18, 19, it is to be noted that upon pivoting the lever arm 29 in steering, the cross head 26 is pivoted in the direction of the turn and the flexible runners 18, 19 are pivoted longitudinally about their pivots 24 and 25 in the opposite direction of the turn to effect a banking action. The portions of the runners 18, 19 forward of the pivot 24 are thus flexed and bowed in the direction of the turn. Likewise, it is to be noted that the forward portion of the lever arm 29, between its forward pivotal attachment with the cross head 26 and the pivot 28, provides a shorter radius of curvature for pivotal movement of the central portion of the cross head 26 than is provided by the portion of each of the runners 18, 19 which lies forward of its knee 20. Upon pivoting the lever arm 29 about the pivot 28, the cross head 26 is thus pivotally moved rearwardly a greater distance than is permitted by the unflexed forward portions of the runners 18, 19. As a result, the portions of the runners 18, 19 forward of the knees 20 are subjected to a compressional force and are accordingly bowed additionally in the direction of the turn.

Figure 2:
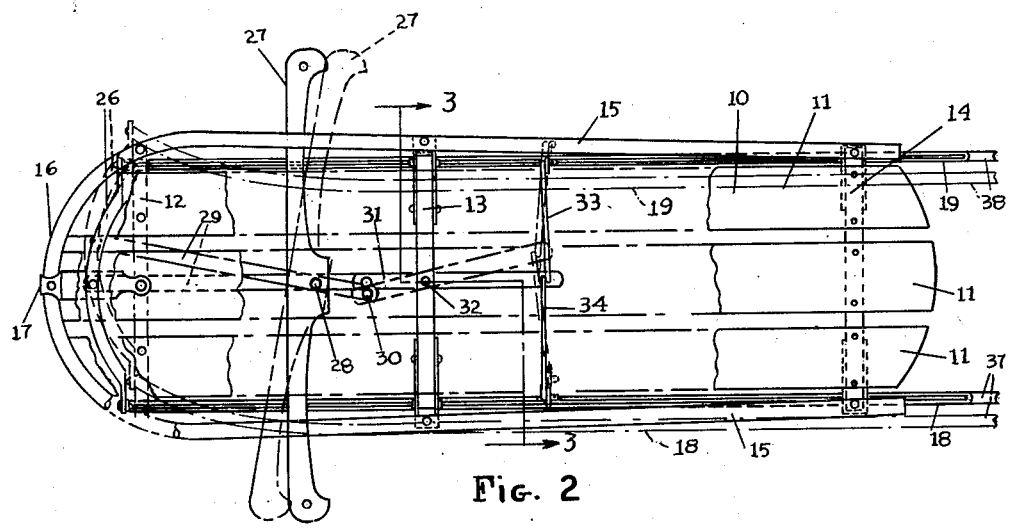
Figure 3:
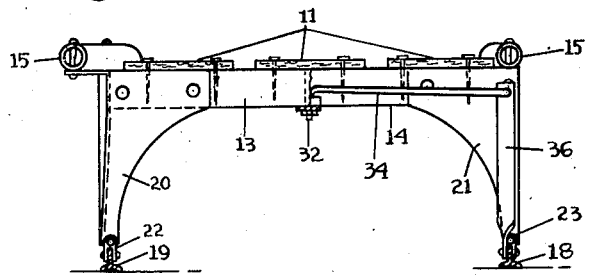
Fig. 3 is a sectional view taken substantially along the staggered line 3—3 of Fig. 2 looking in the direction of the arrows, and showing the steering mechanism and the runners in position for motion of the sled in a straight linear direction.

As shown in the solid line portion in Fig. 2 and in Fig. 3, the steering mechanism is shown in position to effect a straight line motion of the sled along a linear path. When the steering mechanism is moved to the dotted line position shown in Fig. 2 and to the position shown in Fig. 4, the runners 18 and 19 are bowed at their front ends and are pivoted in their body portions to turn the sled to the right. As shown in these views pivotal movement of the steering bar 27 is transferred through the lever 29 to the cross-head 26 to effect a bowing of the connected forward ends of the runners 18 and 19, and simultaneously to effect a pivoting of the lever 31 about its pivot point 32. The pivotal movement of the lever 31 is translated through the cross links 33 and 34 to the brackets 35 and 36 to effect pivotal movement of the runners 18 and 19 about the hinge pins 24 and 25.

Figure 4:
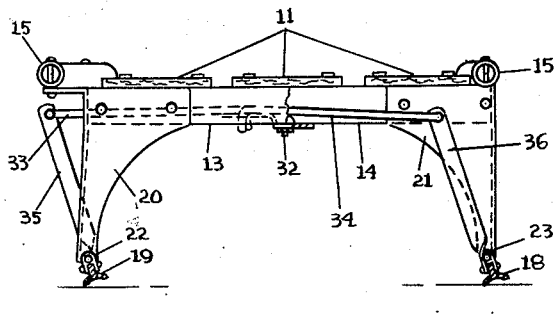
Fig. 4 is a sectional view substantially the same as that of Fig. 3 but showing the steering mechanism and the runners in position for turning the sled to the right.

The construction herein disclosed thus provides a construction in which the top deck and the knees may be rigidly connected since the pivotal connection between the runners and the ends of the knees imparts flexibility thereto for purposes of steering the sled. As shown most clearly in Fig. 4, the sled structure is such that the top deck 10 remains substantially parallel to the ground and to the runners while the runners are pivoted to provide a banking effect. The banking effect of the runners as shown in Fig. 4 effectively prevents tangential skidding of the sled during its turning movement, for the tilting of the runners causes the downwardly extending edge portion of the runner to cut through the surface of the ice or snow while the upper edges of the runner will exert a force horizontally against the contacting surface. The provision of the turned end portions 37 and 38 of the runners is a desirable safety feature for it prevents injury of the users which frequently occurs where sharp unprotected end portions are provided at the rear of the runners.

I claim:

1. In a coasting sled, a rigid deck, rigid runner supporting knees extending downwardly from said deck, a pair of flexible runners pivotally connected at the lower ends of said knees for rotatable movement about axes parallel to the longitudinal axes of said runners to permit a pivotal banking action in steering, means to effect a bowing movement of said runners in steering and including a cross head pivotally secured to the forward ends of each of said flexible runners so as to permit said pivotal banking action, steering means operatively connected with said cross head and runners for bowing the forward portions of the latter by pivoting said cross head about a vertical axis passing through said steering means rearward from said crosshead and for simultaneously pivotally banking said runners.

2. The construction in a coasting sled as claimed in claim 1 and being further characterized in that said steering means includes a steering bar pivotally connected to said deck, a forwardly extending lever arm secured to said steering bar for pivoting therewith and pivotally connected with said cross head for pivoting thereof, and an operable linkage between said runners and said steering bar for pivotally banking said runners, said forwardly extending lever arm being shorter than the forward portion of each of said runners between the pivotal attachment thereof with said cross head and its foremost supporting knee.

3. In a coasting sled, a rigid deck, rigid runner supporting knees extending downwardly from said deck, a pair of flexible runners pivotally connected to the ends of said knees for pivotal banking movement essentially about the longitudinal axes of said runners, means to effect bowing of the forward portions of said runners and comprising a pivotal cross head pivotally connected at its lateral ends essentially perpendicularly to the forward ends of said runners, each of said runners being pivotal at its attachment with said cross head about a horizontal axis perpendicular to said cross head, a steering bar pivotally connected to said deck, means for pivoting said cross head and including a lever rigidly connected with said steering bar and having a forwardly extending arm secured to said cross head, and means to effect said pivotal banking movement of said runners and including a rearwardly extending arm of said lever pivotally connected at its rearward end with a pair of cross links attached at their lateral ends to the upper ends of rigid brackets secured to said runners and extending upward therefrom, 4. In a coasting sled, a rigid deck, a pair of flexible runners substantially T-shaped in cross section and having their vertical webs pivotally connected to the ends of rigid knees extending downwardly beneath said deck whereby said runners are hinged for rotative banking movement about their longitudinal axes, a cross-head pivotally connected at the forward ends of said runners, a steering bar pivotally secured to said deck, an arm secured to said steering bar and extending forwardly therefrom to a point of pivotal connection with said cross-head, the said arm being adapted to effect pivotal movement of said cross-head about the point of attachment of said steering bar to said deck with resultant bowing of the forward portions of said runners upon movement of said steering bar, and means connected with said runners and actuated by said steering bar to effect said rotative banking movement.

5. In a coasting sled, a rigid deck, a pair of flexible runners substantially T-shaped in cross section and having their vertical webs pivotally connected to the ends of rigid knees extending downwardly beneath said deck whereby said runners are hinged for rotative banking movement about their longitudinal axes, a cross-head pivotally connected at the forward ends of said runners, a steering bar pivotally secured to said deck and connected with a lever, having a forwardly extending arm pivotally secured to said cross-head for pivoting the latter about the pivot axis of the steering bar, and a rearwardly extending arm pivotally connected through a train of levers with said runners to effect said rotative banking thereof.

6. In a coasting sled, a rigid deck, a pair of flexible runners mounted beneath said deck for rotative banking movement about their longitudinal axes and pivotally connected at their front ends to a cross-head, a steering bar secured to said deck and movable relative thereto and connected with a lever having a forwardly extending arm to said cross-head for pivoting said cross-head about a pivot axis through said forwardly extending arm to effect bowing of the said runner, said lever also having a rearwardly extending arm pivotally connected with said runners through a train of levers, said train of levers including a lever pivotally mounted on said deck and connected at its forward end with said rearwardly extending arm and pivotally connected at its rear end with a pair of cross links attached to rigid brackets secured to said runners to effect said rotative banking movement.

7. In a coasting sled, a rigid deck, a pair of flexible runners substantially T-shaped in cross-section and having their vertical webs pivotally connected to the ends of rigid knees extending downwardly beneath said deck whereby said runners are hinged for rotative banking movement about their longitudinal axes, a steering bar secured to said deck and connected with a lever for pivoting therewith, said lever having a forwardly extending arm, pivotally connected to said deck, a cross-head pivotally secured to the forward end of said arm and pivotally connected to the front ends of said runners to effect bowing movement of said runners upon pivoting of said cross-head about the pivotal attachment of said arm, said lever also having a rearwardly extending arm pivotally connected with said runners through a train of levers, said train of levers including a lever pivotally mounted on said deck and connected at its forward end with said rearwardly extending arm and pivotally connected at its rear end with a pair of cross links attached to rigid brackets secured to said runners to effect said pivotal banking movement.

8. In a coasting sled, a rigid frame, a pair of flexible runners mounted beneath said frame for rotative banking movement about their longitudinal axes and pivotally connected at their front ends to a cross-head, an arm pivotally connected to said cross-head and extending rearwardly therefrom to a pivotal connection with said rigid frame, a steering bar secured to said arm and adapted to effect bowing of said runners through said arm by pivoting said cross-head about said pivotal connection of the arm with said rigid frame, and means connected with said runners and actuated by said steering bar to effect said rotative banking movement.

MAX A. HOLBROOK.

REFERENCES CITED

The following references are of record in the file of this patent:

UNITED STATES PATENTS

| Number | Name | Date |
|---|---|---|
| 1,242,514 | Bourdon et al. | Oct. 9, 1917 |
| 1,303,388 | Reach | May 13, 1919 |
| 1,600,735 | Pederson | Sept. 21, 1926 |
| 1,888,857 | Greene | Nov. 22, 1932 |
| 2,317,048 | Fosbak | Apr. 20, 1943 |

FOREIGN PATENTS

| Number | Country | Date |
|---|---|---|
| 53,245 | Austria | Apr. 25, 1912 |
| 46,758 | Sweden | Mar. 31, 1920 |